United States Patent
Shimoda (10) Patent No.: US 10,913,994 B2
(45) Date of Patent: Feb. 9, 2021

(54) ZN—AL—MG-BASED PLATED STEEL SHEET

(71) Applicant: NIPPON STEEL CORPORATION, Tokyo (JP)

(72) Inventor: Nobuyuki Shimoda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/641,461

(22) PCT Filed: Sep. 8, 2017

(86) PCT No.: PCT/JP2017/032457
§ 371 (c)(1),
(2) Date: Feb. 24, 2020

(87) PCT Pub. No.: WO2019/049307
PCT Pub. Date: Mar. 14, 2019

(65) Prior Publication Data
US 2020/0181751 A1    Jun. 11, 2020

(51) Int. Cl.
*C23C 2/06* (2006.01)
*C23C 2/12* (2006.01)
(Continued)

(52) U.S. Cl.
CPC .............. *C23C 2/06* (2013.01); *B32B 15/012* (2013.01); *B32B 15/013* (2013.01); *B32B 15/04* (2013.01);
(Continued)

(58) Field of Classification Search
CPC ......... C23C 30/00; C23C 30/005; C23C 2/06; C23C 2/12; C23C 2/40; C23C 2/26;
(Continued)

(56) References Cited

U.S. PATENT DOCUMENTS 3,343,930 A    9/1967   Borzillo
2012/0282488 A1*  11/2012  Fujii ................. C23C 28/021
428/677

FOREIGN PATENT DOCUMENTS

JP    59-56570 A    4/1984
JP    2000-328216 A    11/2000
(Continued)

OTHER PUBLICATIONS

"Cold-reduced carbon steel sheet and strip", JIS G 3141, 2017, total 80 pages.
(Continued)

*Primary Examiner* — Michael E. La Villa
(74) *Attorney, Agent, or Firm* — Birch, Stewart, Kolasch & Birch, LLP (57) ABSTRACT

A Zn—Al—Mg-based plated steel sheet has, an alloy layer formed on a surface of a steel sheet and contains Fe and Si, and a plated layer formed on a surface of the alloy layer opposite to the steel sheet, in which the plated layer and the alloy layer include, in mass %, Al: 45.0 to 65.0%, Si: 0.50 to 5.00%, Mg: 1.00 to 10.00%, and a balance of Zn, Fe, and impurities, the plated layer contains 0.1 to 20.0% of a Mg—Si phase in terms of volume fraction, an average equivalent circle diameter of the Mg—Si phase in the surface layer area is 0.1 to 15.0 μm, and an integrated value of a Si content from the surface to thickness center of the plated layer is 0.55 times or more of an integrated value of the Si content from the surface to an interface.

4 Claims, 3 Drawing Sheets

(51) Int. Cl.

| | | |
|---|---|---|
| *C23C 2/40* | (2006.01) |
| *C22C 18/04* | (2006.01) |
| *C22C 21/10* | (2006.01) |
| *C23C 30/00* | (2006.01) |
| *B32B 15/01* | (2006.01) |
| *B32B 15/04* | (2006.01) |
| *C23C 2/26* | (2006.01) |
| *C23C 28/02* | (2006.01) |
| *B32B 15/18* | (2006.01) |
| *C23C 2/28* | (2006.01) |
| *C23C 2/02* | (2006.01) |

(52) U.S. Cl.
CPC ............ *B32B 15/043* (2013.01); *B32B 15/18* (2013.01); *C22C 18/04* (2013.01); *C22C 21/10* (2013.01); *C23C 2/02* (2013.01); *C23C 2/12* (2013.01); *C23C 2/26* (2013.01); *C23C 2/28* (2013.01); *C23C 2/40* (2013.01); *C23C 28/02* (2013.01); *C23C 28/021* (2013.01); *C23C 28/023* (2013.01); *C23C 28/025* (2013.01); *C23C 28/028* (2013.01); *C23C 30/00* (2013.01); *C23C 30/005* (2013.01); *Y10T 428/12757* (2015.01); *Y10T 428/12799* (2015.01); *Y10T 428/12958* (2015.01); *Y10T 428/12972* (2015.01); *Y10T 428/12979* (2015.01); *Y10T 428/2495* (2015.01); *Y10T 428/24942* (2015.01)

(58) Field of Classification Search
CPC ......... C23C 2/28; C23C 28/021; C23C 28/02; C23C 28/023; C23C 28/025; C23C 28/028; C23C 2/20; C22C 18/04; C22C 21/10; B32B 15/012; B32B 15/013; B32B 15/04; B32B 15/043; B32B 15/18; Y10T 428/12757; Y10T 428/12799; Y10T 428/12958; Y10T 428/12972; Y10T 428/24942; Y10T 428/2495; Y10T 428/12979
See application file for complete search history.

(56) References Cited

FOREIGN PATENT DOCUMENTS

| | | |
|---|---|---|
| JP | 2002-322527 A | 11/2002 |
| JP | 2005-133151 A | 5/2005 |
| JP | 2012-528244 A | 11/2012 |
| JP | 2016-166414 A | 9/2016 |
| JP | 6059408 B1 | 1/2017 |
| WO | WO 2010/135779 A1 | 12/2010 |

OTHER PUBLICATIONS

International Search Report for PCT/JP2017/032457 dated Oct. 24, 2017.
Written Opinion of the International Searching Authority for PCT/JP2017/032457 (PCT/ISA/237) dated Oct. 24, 2017.

* cited by examiner

ZN—AL—MG-BASED PLATED STEEL SHEET

TECHNICAL FIELD OF THE INVENTION

The present invention relates to a Zn—Al—Mg-based plated steel sheet and particularly relates to a Zn—Al—Mg-based plated steel sheet having excellent corrosion resistance and workability.

RELATED ART

Conventionally, it is widely known to improve the corrosion resistance of a steel material by applying Zn plating to the surface of a steel material, and a steel material subjected to Zn plating is being mass-produced at present. However, in many applications, corrosion resistance may be insufficient with only Zn plating. Therefore, in recent years, a hot-dip Zn—Al alloy plated steel sheet (Galvalume Steel Sheet (registered trademark)) in which the corrosion resistance of the steel material is further improved than Zn plated steel sheet has been used.

For example, a hot-dip Zn—Al plated steel sheet obtained by applying an alloy plating including Al at a content of 25 to 75 mass %, Si at a content of 0.5% or more of the Al content, and a balance substantially being Zn is disclosed in Patent Document 1. According to Patent Document 1, a hot-dip Zn—Al alloy plated layer not only being practically excellent in corrosion resistance but also having good adhesion to steel and good external appearance is obtained. However, in the plated steel sheet of Patent Document 1, the plated layer does not contain Mg, and the corrosion resistance is not sufficient.

Patent Document 2 discloses that corrosion resistance is improved by adding Mg in a plated layer.

However, in recent years, there has been an increasing demand for corrosion resistance compared to a conventional plated layer. As in Patent Document 2, by simply incorporating Mg in the plated layer, the corrosion resistance is not sufficient in a more severe environment (an environment where high corrosion resistance is required).

Patent Document 3 discloses an Al—Zn—Si—Mg alloy coated strip in which fine spherical $Mg_2Si$ phase particles are dispersed in a coating by forced cooling the coating strip. In Patent Document 3, it is described that by changing the $Mg_2Si$ phase into fine spherical particles, the cracking of the coating is potentially reduced and the corrosion resistance of the coating is improved.

Patent Document 4 discloses a hot-dip Al—Zn—Mg-based plated steel sheet in which the major axis of the precipitated phase in the plated layer is set to 0.5 μm or less by setting the average cooling rate to a predetermined range or more until the plated layer is solidified.

However, as a result of investigations of the present inventors, it is found that as in Patent Documents 3 and 4, by simply refining the $Mg_2Si$ phase, sufficient corrosion resistance cannot be obtained in a severe corrosion environment.

Patent Document 5 discloses a hot-dip Al—Zn—Mg—Si-based plated steel sheet containing $Mg_2Si$. Patent Document 5 discloses that by cooling a steel sheet at a cooling rate lower than 10° C./sec in a temperature range in which $Mg_2Si$ easily formed, $Mg_2Si$ is finely and uniformly dispersed in the entire plating main layer and processed portion corrosion resistance is improved.

In addition, Patent Document 6 discloses that by cooling a steel sheet at a cooling rate lower than 10° C./sec in a temperature range in which $Mg_2Si$ easily formed, $Mg_2Si$ is finely and uniformly dispersed in the entire plating main layer, further, by setting the oxygen concentration of a wiping gas to 10 vol % or more, the area fraction of $Mg_2Si$ in the surface of the plating main layer is increased to 10% or more, and the corrosion resistance of the flat sheet portion and the end portion is improved.

However, as a result of the investigations of the present inventors, it is found that $Mg_2Si$ formed by gradually cooling the formation temperature range is not sufficiently refined. It is found that $Mg_2Si$, which is not sufficiently refined, has a small contribution to corrosion resistance and in the hot-dip Al—Zn—Mg—Si plated steel sheets in Patent Documents 5 and 6, sufficient corrosion resistance cannot be obtained in a severe corrosion environment.

PRIOR ART DOCUMENT

Patent Document

[Patent Document 1] U.S. Pat. No. 3,343,930
[Patent Document 2] Japanese Unexamined Patent Application, First Publication No. S59-056570
[Patent Document 3] Published Japanese Translation No. 2012-528244 of the PCT International Publication
[Patent Document 4] Japanese Unexamined Patent Application, First Publication No. 2005-133151
[Patent Document 5] Japanese Patent No. 6059408
[Patent Document 6] Japanese Unexamined Patent Application, First Publication No. 2016-166414

DISCLOSURE OF THE INVENTION

Problems to be Solved by the Invention

The present invention is made in consideration of the above circumstances. An object of the present invention is to provide a Zn—Al—Mg-based plated steel sheet having sufficient workability and excellent corrosion resistance.

Means for Solving the Problem

As a result of intensive investigations conducted by the present inventors, the present inventors have found that a Mg—Si phase ($Mg_2Si$) formed in a plated layer is a structure effective for improving corrosion resistance, and it is important that the Mg—Si phase is intensively present on the surface side and the average equivalent circle diameter of the Mg—Si phase is controlled to be in a predetermined range in order to improve the corrosion resistance without lowering the workability.

The present invention has been made based on the above finding and the gist thereof is as follows.

(1) A Zn—Al—Mg-based plated steel sheet according to an aspect of the present invention including: a steel sheet; an alloy layer which is formed on a surface of the steel sheet and contains Fe and Si; and a plated layer which is formed on a surface of the alloy layer opposite to the steel sheet, in which an average composition of the plated layer and the alloy layer includes, in mass %, Al: 45.0 to 65.0%, Si: 0.50 to 5.00%, Mg: 1.00 to 10.00%, and a balance of Zn, Fe, and impurities, the plated layer contains 0.1 to 20.0% of a Mg—Si phase in terms of volume fraction, in a case where a 1 m range from a surface of the plated layer in a thickness direction of the plated layer is defined as a surface layer area of the plated layer, an average equivalent circle diameter of the Mg—Si phase in the surface layer area in a direction in which the plated layer is overserved in a plane view is obtained is 0.1 to 15.0 μm, and in a case where a ½ thickness position of the plated layer from the surface of the plated layer to an interface between the plated layer and the alloy layer is defined as a thickness center of the plated layer and a Si content is measured over the entire thickness of the plated layer, an integrated value of the Si content from the surface of the plated layer to the thickness center of the plated layer is 0.55 times or more of an integrated value of the Si content from the surface of the plated layer to the interface.

(2) In the Zn—Al—Mg-based plated steel sheet according to (1), the integrated value of the Si content from the surface of the plated layer to the thickness center of the plated layer may be 0.60 times or more of the integrated value of the Si content from the surface of the plated layer to the interface.

(3) In the Zn—Al—Mg-based plated steel sheet according to (1), the average composition of the plated layer and the alloy layer may further include 0.01 to 1.00% in total of one or more of the group consisting of Cr, Ca, Sr, and Ni.

Effects of the Invention

According to the present invention, it is possible to provide a Zn—Al—Mg-based plated steel sheet having sufficient workability and excellent corrosion resistance. In addition, the Zn—Al—Mg-based plated steel sheet according to the present invention is suitable for building materials, automobiles and home electric appliances.

EMBODIMENTS OF THE INVENTION

A steel sheet which is an original steel sheet for plating is immersed in a hot dip plating bath containing Al, Si, Mg, and Zn to form a plated layer including these elements on a steel sheet surface. The present inventors have confirmed that $Mg_2Si$ which is a compound of Mg and Si is formed as a Mg—Si phase in the plated layer by adjusting the composition of the plating bath. By allowing $Mg_2Si$ to be present in the plated layer, the corrosion resistance of the plated layer is improved.

As a result of further investigations, the present inventors have found that by distributing a large amount of $Mg_2Si$ on a side closer to the surface of the plated layer (the surface opposite to the surface in contact with the alloy layer), the corrosion resistance of the plated layer can be further improved. However, it has been found that it is not preferable to simply increase the number of Mg—Si phases since the workability is lowered in a case where the volume fraction of the Mg—Si phase in the plated layer is excessively increased.

Here, the present inventors have found that by controlling the Mg—Si phase so as to distribute a large amount of $Mg_2Si$ on the surface side of the plated layer and reducing the size (average equivalent circle diameter) of $Mg_2Si$ present at a position close to the surface of the plated layer to a predetermined range, the corrosion resistance can be further improved while sufficient workability is secured.

Hereinafter, a Zn—Al—Mg-based plated steel sheet (hereinafter, sometimes referred to as a plated steel sheet according to an embodiment) according to an embodiment of the present invention will be described.

The plated steel sheet according to the embodiment has a steel sheet, an alloy layer which is formed on the surface of the steel sheet and contains Fe and Si, and a plated layer which is formed on a surface of the alloy layer opposite to the steel sheet.

The average composition of the plated layer and the alloy layer includes, in mass %, Al: 45.0 to 65.0%, Si: 0.50 to 5.00%, Mg: 1.00 to 10.00%, optionally 0.01 to 1.00% in total of one or more of the group consisting of Cr, Ca, Sr, and Ni, and a balance of Zn, Fe, and impurities.

In addition, the plated layer includes 0.1 to 20 vol % of the Mg—Si phase in terms of volume fraction, and the average equivalent circle diameter of the Mg—Si phase in the surface layer area of the plated layer is 0.1 to 15.0 μm.

In a case where the Si content is measured over the entire thickness of the plated layer from the surface of the plated layer to the interface between the plated layer and the alloy layer in the plated layer, an integrated value of the Si content from the surface of the plated layer to the thickness center of the plated layer is 0.55 times or more of an integrated value of the Si content of the entire thickness of the plated layer. That is, a larger amount of Si is present in an upper layer portion of the plated layer which is the surface side of the plated layer from the ½ thickness position than in a lower region which is the steel sheet side from the ½ thickness position of the plated layer.

The plated layer and the alloy layer may be formed on one surface or both surfaces of the steel sheet.

<Steel Sheet>

The steel sheet which becomes an original steel sheet for plating may be either a hot-rolled steel sheet or a cold-rolled steel sheet and is not particularly limited. The material thereof is not particularly limited and any of normal steel, Al killed steel, high alloy steel, and the like can be applied.

By applying a hotdip plating method to the steel sheet which becomes an original steel sheet for plating, the plated steel sheet according to the embodiment can be obtained.

Regarding the sheet thickness of the steel sheet, the sheet thickness is not particularly limited as long as the sheet thickness is in a range in which the steel sheet is allowed to pass through continuous hot dip plating equipment, but from the viewpoint of stable production, a large sheet thickness is preferable. In a case where the sheet thickness is large, the amount of heat held by the steel sheet during plating formation is large and the temperature decrease behavior of the steel sheet becomes slow. Therefore, it is advantageous to cool the molten metal of the plating bath adhering to the steel sheet so that solidification proceeds in one direction from the surface side to the steel sheet side.

<Plated Layer>

(Average Composition of Plated Layer and Alloy Layer)

In a case where the steel sheet is immersed in the plating bath, the plated layer is formed on the steel sheet and a part of the plated layer is alloyed to form an alloy layer between the plated layer and the steel sheet.

The average composition of the plated layer and the alloy layer formed on the steel sheet includes Al: 45.0 to 65.0%, Si: 0.50 to 5.00%, Mg: 1.00 to 10.00%, and a balance of Zn, Fe, and impurities. If required, the average composition may further contain 0.01 to 1.0% in total of Cr, Ca, Sr, and Ni. The unit of the average composition is mass %. In the following description, the unit is simply expressed as %.

The average composition of the plated layer and the alloy layer can be measured by dissolving the plated layer and the alloy layer from the plated steel sheet according to the embodiment in which the plated layer and the alloy layer are formed using hydrochloric acid or the like, and analyzing the composition of the separated plated layer and alloy layer by ICP analysis. Specifically, the plating composition can be obtained using the mass of the plated layer and the alloy layer dissolved in hydrochloric acid as a denominator, and using the mass of the element quantitatively determined by ICP as a numerator.

Hereinafter, the reason for limitation of each component will be described.

(Al: 45.0 to 65.0%)

In a case where the Al content is less than 45.0%, the corrosion resistance of the flat portion of the plated layer is not sufficient. Therefore, the Al content is set to 45.0% or more. Preferably, the Al content is 50.0% or more.

On the other hand, in a case where the Al content is more than 65.0%, the corrosion resistance of the cut end surface of the plated layer is lowered. In addition, in a case where the Al content is more than 65.0%, it is required that the temperature of the plating bath is maintained at a high temperature and thus there is a problem that the production cost increases. Accordingly, the Al content is set to 65.0% or less. A more preferable range is 60.0% or less.

In addition, regarding the corrosion resistance, in a case where the effect of improving the barrier properties of the plated layer by Al is the main factor rather than the effect of sacrificial protection by Zn, it is preferable that the Al content is set to be higher than the Zn content.

(Si: 0.50 to 5.00%)

Si is an element that forms a compound with Mg to contribute the corrosion resistance. In addition, when the plated layer is formed on the steel sheet, Si is an element having effects of suppressing formation of an excessively thick alloy layer to be formed between the steel sheet surface and the plated layer and improving adhesion between the steel sheet and the plated layer.

In a case where the Si content is less than 0.50%, these effects cannot be sufficiently obtained. Therefore, the Si content is set to 0.50% or more. Preferably, the Si content is 1.00% or more.

On the other hand, in a case where the Si content is more than 5.00%, an excessive amount of Si in the plated layer is precipitated, the corrosion resistance is lowered, and the workability of the plated layer is also lowered. Accordingly, the Si content is set to 5.00% or less. From the viewpoint of workability, the Si content is preferably set to 3.00% or less. A more preferable range of the Si content is 2.00% or less.

(Mg: 1.00 to 10.00%)

Mg is an element having an effect of improving the corrosion resistance of the plated layer. In a case where the Mg content is less than 1.00%, $Mg_2Si$ is not suitably formed and thus the corrosion resistance is not significantly improved. Therefore, the Mg content is set to 1.00% or more. Preferably, the Mg content is 1.50% or more.

On the other hand, in a case where the Mg content is more than 10.00%, the effect of improving the corrosion resistance is saturated and the workability of the plated layer is lowered. In addition, there arises a production problem such as an increase in the amount of dross generated in the plating bath. Therefore, the Mg content is set to 10.00% or less. From the viewpoint of productivity, it is more preferable that the Mg content is set to 3.50% or less. More preferably, the Mg content is 3.00% or less.

Basically, the plated layer and the alloy layer of the plated steel sheet according to the embodiment contains the above elements and the balance includes Zn, Fe, and impurities. However, in order to further improve the corrosion resistance of the plated layer, if required, alkaline earth metals such as Sr and Ca and Cr or Ni may be contained therein. Since these elements are not necessarily required to be included and the lower limit is 0%.

Further, the impurities mean elements which are unavoidably incorporated into steel during a process of plating of Pb, Sb, Sn, Cd, Mn, Cu, Ti, and the like. As long as the total amount of these impurities is 1.0% or less, these impurities may be included since these impurities do not adversely affect properties.

(Total of Cr, Ca, Sr, and Ni: 0 to 1.00%)

These elements are not necessarily required to be contained and the lower limit is 0%. In a case where the total content of Cr, Ca, Sr, and Ni is less than 0.01%, a sufficient effect of improving the corrosion resistance is exhibited. Therefore, in a case where the effect of improving the corrosion resistance is obtained, it is preferable that one or two or more of these elements are contained in a total of 0.01% or more. More preferably, the total amount of these elements is 0.05% or more.

On the other hand, in a case where the total amount of Cr, Ca, Sr, and Ni is more than 1.00%, the effect of improving the corrosion resistance may be saturated and the amount of dross generated in the plating bath may also exceed the allowable range.

Therefore, even in a case where Sr, Ca, Cr and/or Ni is contained, the total amount is preferably set to 1.00% or less. A more preferable upper limit is 0.20% and a still more preferable upper limit is 0.10%.

(Volume Fraction of Mg—Si Phase in Plated Layer)

By setting the volume fraction of the Mg—Si phase in the plated layer to 0.1% or more, the corrosion resistance of the plated layer can be improved. Therefore, the volume fraction of the Mg—Si phase is set to 0.1% or more. The volume fraction is preferably 1.0% or more, more preferably 2.0% or more, still more preferably 5.0% or more, and still even more preferably 10.0% or more.

On the other hand, in a case where the volume fraction of the Mg—Si phase is more than 20.0%, the workability is lowered. Therefore, the volume fraction of the Mg—Si phase is set to 20.0% or less. The volume fraction is preferably 18.0% or less, more preferably 15.0% or less, still more preferably 10.0% or less, and still even more preferably 5.0% or less.

The volume fraction of each phase constituting the plated layer is equal to the area fraction of each phase exposed at the cross section of the plated layer. Thus, by mapping the element distribution using SEM-EDS, and obtaining the area fraction of each phase of the cross section of the plated layer (cross section area fraction), the volume fraction can be specified.

(Average Equivalent Circle Diameter of Mg—Si Phase in Surface Layer Area)

In a case where a 1 μm range from the surface of the plated layer in the thickness direction of the plated layer is defined as the surface layer area of the plated layer, the average equivalent circle diameter of the Mg—Si phase of the surface layer area in a direction, in which the plated layer is observed in the plane view, is 0.1 to 15.0 μm.

In a case where the average equivalent circle diameter is less than 0.1 μm, the corrosion resistance of the plated layer is lowered. Therefore, the average equivalent circle diameter of the Mg—Si phase of the surface layer area of the plated layer is set to 0.1 μm or more. On the other hand, in a case where the average equivalent circle diameter of the Mg—Si phase is more than 15.0 μm, the plated layer itself is brittle and the workability is lowered. Therefore, the average equivalent circle diameter of the Mg—Si phase in the surface layer area is set to 15.0 μm or less.

The average equivalent circle diameter according to the embodiment can be measured using the following method.

In a visual field of 500×500 μm or greater from the surface side of the plated layer (from the direction in which the plane view of the surface of the plated layer is obtained), the distribution of Si of the surface layer area of the plated layer (a range at a position at a depth of about 1 μm from the surface of the plated layer) is measured using EPMA. In the plated layer of the plated steel sheet according to the embodiment, as described later, Si is present substantially as the Mg—Si phase. Thus, the area of the phase including the measured Si is calculated, and the diameter of a circle having an area equivalent to the area thereof is equivalent to the circle diameter of the Mg—Si phase. The average equivalent circle diameter is obtained by averaging the equivalent circle diameter of the Mg—Si phase measured in the visual field.

Figure 2A:
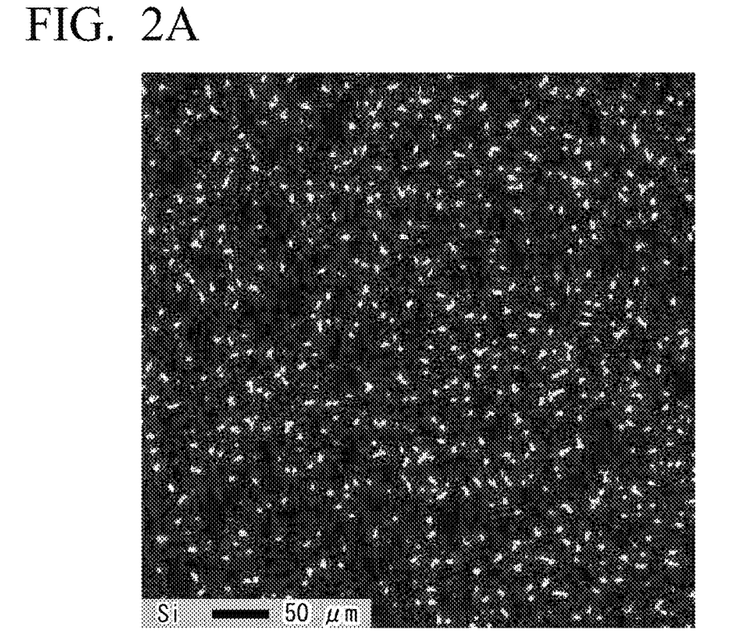
FIG. 2A shows an EPMA analysis result of the surface layer area of the plated layer measured from the surface side of the plated layer of Production No. 3 (Invention Example) in Examples.
Figure 2B:
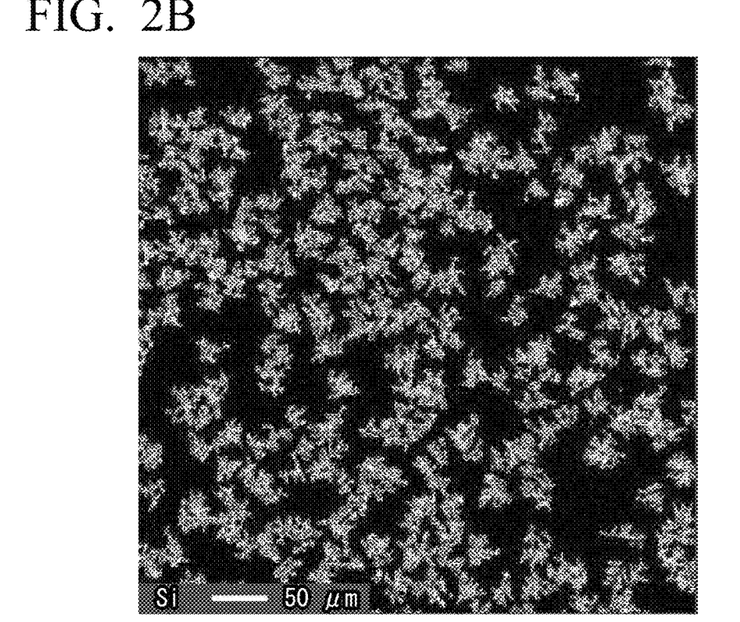
FIG. 2B shows an EPMA analysis result of the surface layer area of the plated layer measure from the surface side of the plated layer of Production No. 23 (Comparative Example) in Examples.

FIGS. 2A and 2B show examples of the Si distribution measured using the method described above.

(Distribution State of Mg—Si Phase in Plated Layer)

In the plated layer of the plated steel sheet according to the embodiment, the Mg—Si phase is distributed such that a larger number of Mg—Si phases are present on the surface side of the plated layer than on the steel sheet side when the center of the plated layer in the thickness direction is set as the reference. Thus, excellent corrosion resistance can be obtained without deteriorating the workability.

Figure 3A:
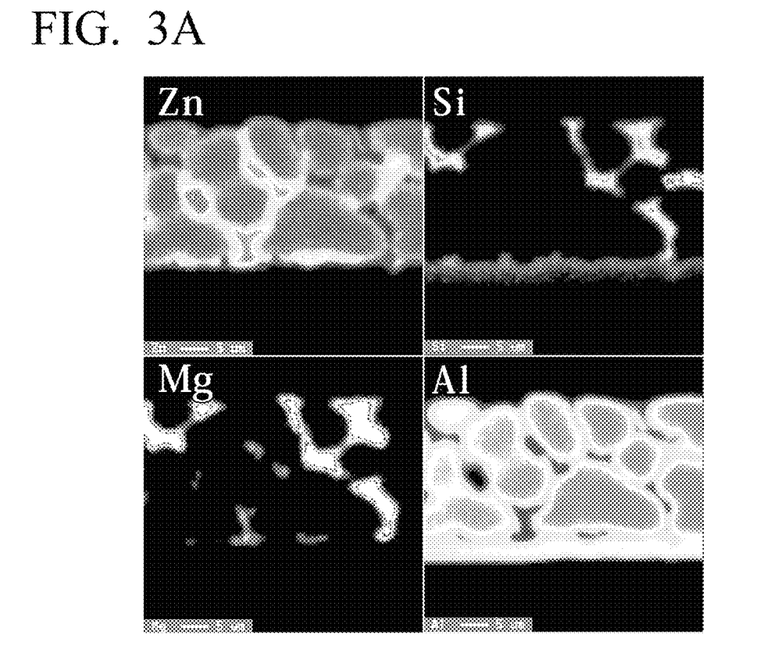
FIG. 3A shows an EPMA analysis result of the cross section of the plated layer of Production No. 3 (Invention Example) in Examples.
Figure 3B:
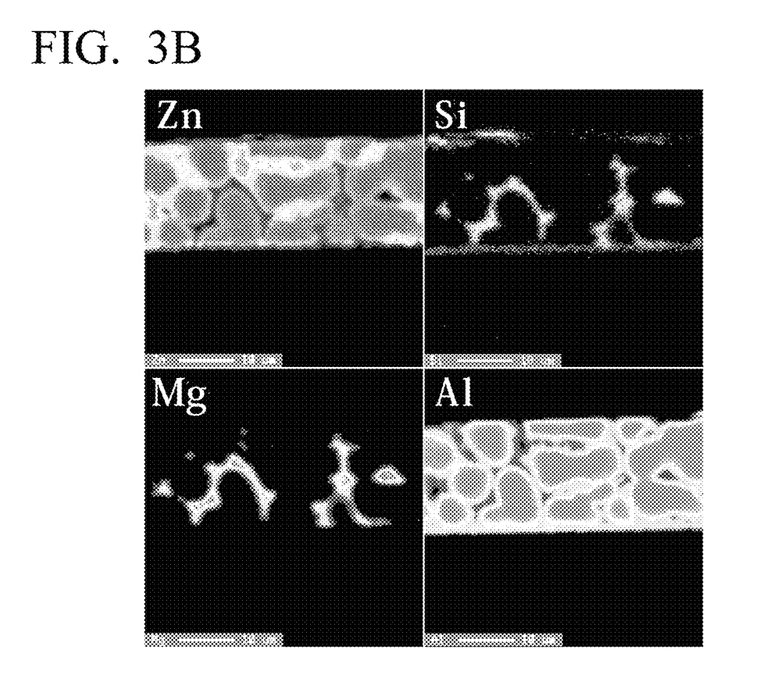
FIG. 3B shows an EPMA analysis result of the cross section of the plated layer of Production No. 23 (Comparative Example) in Examples.

Here, as can be seen from the EPMA analysis result of the cross section of the plated layer shown in FIG. 3A, in the plated layer of the plated steel sheet according to the embodiment, Si is present at the same position as Mg. That is, Si is considered to be present as the Mg—Si phase ($Mg_2Si$).

Therefore, in a case where in the plated layer of the plated steel sheet according to the embodiment, a ½ thickness position of the plated layer from the surface of the plated layer in the thickness direction of the plated layer (hereinafter, sometimes referred to as the thickness center of the plated layer) is used as a reference, as long as Si is distributed such that a large amount of Si is present on the surface side from the thickness center of the plated layer compared to the steel sheet side from the thickness center of the plated layer, it can be determined that a large number of Mg—Si phases are present on the surface side of the plated layer than on the steel sheet of the plated layer when the center of the plated layer in the thickness direction is set as the reference.

Hereinafter, based on the thickness center of the plated layer, the steel sheet side from the thickness center of the plated layer is sometimes referred to as a lower portion of the plated layer, and the surface side from the thickness center of the plated layer is sometimes referred to as an upper layer portion of the plated layer.

In the plated steel sheet according to the embodiment, it can be determined that "a larger number of Mg—Si phases are present in the upper layer portion of the plated layer than in the lower layer portion of the plated layer" in the following case.

Specifically, using a glow discharge optical emission spectroscopic analyzer (GDS), the Si content is continuously measured by setting the measurement diameter to 4 mm and performing element analysis while digging a sample by sputtering to the interface between the plated layer and the alloy layer from the surface of the plated layer in the thickness direction. Regarding the obtained measured value, the Si content from the surface of the plated layer to the thickness center of the plated layer is integrated and the integrated value (Si content integrated value on the surface side) is calculated. In addition, the Si content is integrated over the entire thickness of the plated layer (from the plated layer surface to the interface between the plated layer and the alloy layer) and the integrated value (Si content integrated value over the entire thickness) is calculated.

In a case where the Si content integrated value on the surface side is 0.55 times or more of the Si content integrated value on the surface side, that is, (Si content integrated value on the surface side)/(Si content integrated value over the entire thickness)≥0.55, apparently, it is determined that a larger amount of Si is present on the upper layer portion of the plated layer than on the lower layer portion of the plated layer.

From the viewpoint of corrosion resistance, it is preferable that (Si content integrated value on the surface side)/(Si content integrated value over the entire thickness)≥0.60.

Figure 1:
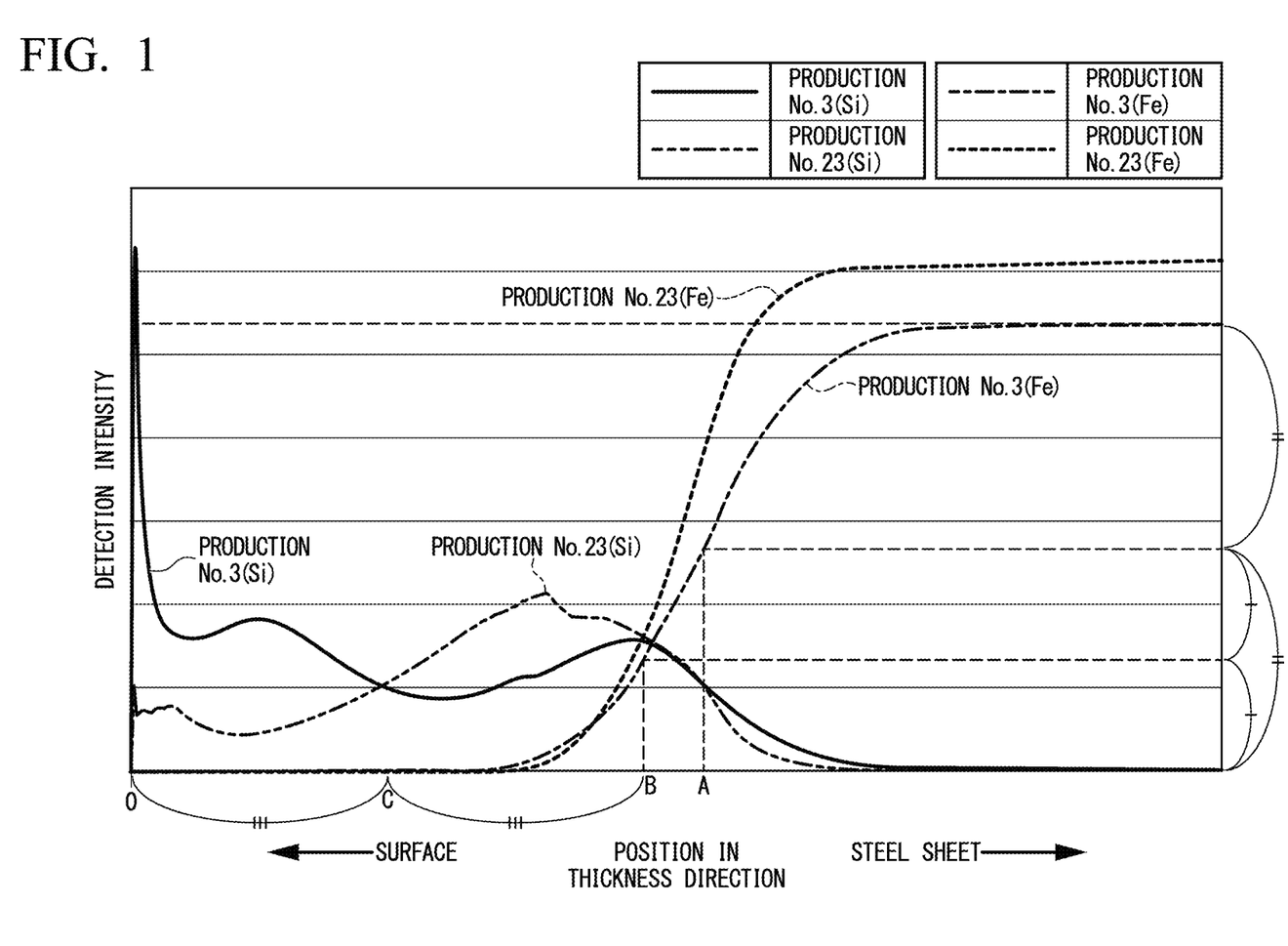
FIG. 1 shows results obtained by measuring a Si content and a Fe content using GDS from the surface of a plated layer in the thickness direction of the plated layer in Production No. 3 (Invention Example) and Production No. 23 (Comparative Example) in Examples.

FIG. 1 is a view of a graph of results of performing measurement of the Si content of a plated steel sheet according to the embodiment (Production No. 3 in Examples described later) and a comparative plated steel sheet (Production No. 23 in Examples described later) in the thickness direction using GDS.

In FIG. 1, the left side of the graph represents the surface of the plated layer and the horizontal axis represents a distance from the surface of the plated layer. In addition, the vertical axis represents the detection intensity of Si or Fe.

In the embodiment, a position where the detection intensity of Fe is 50% of the maximum detection intensity is determined as the interface between the steel sheet and the alloy layer, and a position where the detection intensity of Fe is 25% of the maximum detection intensity is determined as the interface between the alloy layer and the plated layer. Then, the position of half the distance from the surface of the plated layer to the interface between the plated layer and the alloy layer is defined as the thickness center of the plated layer.

That is, taking Production No. 3 in FIG. 1 as an example, a position in the thickness direction where the detection intensity of Fe is 50% of the maximum detection intensity (A position) is determined as the interface between the steel sheet and the alloy layer, and a position in the thickness direction where the detection intensity of Fe is 25% of the maximum detection intensity (B position) is determined as the interface between the plated layer and the alloy layer. Then, the position (C position) of half the distance from the surface of the plated layer to the B position is set to the thickness center of the plated layer.

From FIG. 1, it is found that in the plated layer of the plated steel sheet according to the embodiment, a large amount of Si is present on the surface side. On the other hand, in a steel corresponding to a conventional steel, a large amount of Si is present on the steel sheet side.

(Composition of Plated Layer)

The plated layer includes at least a Mg—Si phase and a phase containing Al and Zn as a composition.

The phase containing Al and Zn is mainly constituted of a dendritic α-Al phase and a ZnAlMg eutectic phase. In the phase containing Al and Zn, according to the average composition of the plated layer, a $MgZn_2$ phase, a Si phase and/or a FeAl phase may be contained.

The Mg—Si phase is a phase constituted of $Mg_2Si$ which is an intermetallic compound of Si and Mg. The Mg—Si phase is precipitated between arms of the α-Al phase.

In the plated steel sheet according to the embodiment, in a case where the steel sheet is pulled up from the plating bath and then the molten metal is solidified under predetermined conditions, the temperature of the molten metal is preferentially lowered from the surface side of the molten metal, and in this case, the Mg—Si phase is precipitated as a primary phase. After the Mg—Si phase is precipitated, the remaining molten metal is solidified to form a phase containing Al and Zn. Particularly, in a case where the phase containing Al and Zn is formed, the Mg—Si phase previously formed on the surface layer side of the molten metal is sandwiched between the arms of the α-Al phase.

A part of the Mg—Si phase formed on the surface layer side of the plated layer may be exposed at the surface of the plated layer. The exposed Mg—Si phase is observed in an island shape.

In a case where a part of the Mg—Si phase (for example, 1.0% or more) is exposed at the surface of the plated layer, spangles are prevented from being formed on the surface. Therefore, the external appearance of the plated steel sheet according to the embodiment greatly differs from Galvalume Steel Sheet (registered trademark) or the like in which spangles are actively formed on the surface.

(Adhesion Amount of Plated Layer)

The adhesion amount of the plated layer is not particularly limited. However, in a case where the adhesion amount is excessively small, the effect of improving the corrosion resistance in the plated layer is small. On the other hand, in a case where the adhesion amount is excessively large, the bending workability of the plated layer is lowered and problems such as cracking easily arise. Therefore, the adhesion amount is preferably 40 to 250 $g/m^2$.

<Alloy Layer>

In a case where the steel sheet is subjected to hot dip plating, an alloy layer (interface alloy layer) is formed between the steel sheet and the plated layer. The alloy layer contains Fe and Si or Fe, Si, and Al. The thickness is 10 μm or less, preferably 5 m or less, and more preferably 3 μm or less.

<Mg Oxide Film>

On the surface layer of the plated layer, a Mg oxide film having a thickness of 5 nm or more and 100 nm or less may be further formed. By providing the Mg oxide film having a thickness of 5 nm or more, the corrosion resistance can be further improved. On the other hand, even in a case where the Mg oxide film is formed, when the thickness is more than 100 nm, the workability is significantly lowered and thus the upper limit of the thickness is set to 100 nm.

As long as the plated steel sheet according to the embodiment has the above constitution, regardless of the production method, the effects can be obtained. However, for example, according to the following production method, the plated layer according to the embodiment can be obtained.

First, it is preferable that the steel sheet is pulled up from the plating bath is rapidly cooled to a temperature range in which the Mg—Si phase ($Mg_2Si$) is precipitated. Since the driving force for precipitation is increased by rapid cooling, the Mg—Si phase can be finely precipitated as a primary phase. In a case of slow cooling, there is a concern that the Mg—Si phase is not refined.

After rapid cooling, the steel sheet to which the molten metal is adhered by immersion in the plating bath is retained in a temperature range in which the Mg—Si phase is precipitated and other phases are not precipitated. Although this temperature range varies depending on the components of the plated layer, in the case of the plated steel sheet according to the embodiment, for example, the temperature range is 400° C. to 450° C.

In a case of rapid cooling, compared to the steel sheet side (inner portion) of the molten metal, the temperature of the surface side of the molten metal is decreased in advance. Accordingly, the Mg—Si phase is preferentially precipitated on the surface side. In a case where the Mg—Si phase is precipitated on the surface side of the molten metal, the concentration of Mg and the Si is lower on the surface side than on the steel sheet side, and a concentration gradient is generated. However, in the retention temperature range, portions other than the Mg—Si phase are in a molten state, and thus Mg and Si move in the plated layer from the steel sheet side to the surface side so as to eliminate the concentration gradient. As a result, a larger number of the Mg—Si phases are precipitated on the surface side of the plated layer than on the steel sheet side.

In a case where the retention temperature is low or the retention time is short, before Mg and Si are concentrated on the surface side in the molten metal, the molten metal is solidified and as a result, a large number of Mg—Si phases may not be present on the surface side.

In a case of obtaining the above effects, it is preferable that the retention time is, for example, 5 seconds or longer in the retention temperature range. On the other hand, even in a case where the retention time is longer than 60 seconds, the effects are saturated and the productivity is lowered. Thus, this case is not preferable.

The retention in the embodiment means that the steel sheet temperature is retained in the retention temperature range for a predetermined period of time, and in the retention temperature range, the temperature is not limited to isothermal holding and may be changed.

Since the Mg—Si phase precipitated on the surface side is fixed after retention, it is preferable that the steel sheet is rapidly cooled to the solidification temperature of the plated layer or lower.

As described above, the plated steel sheet according to the embodiment can be produced.

Examples

Hereinafter, examples of the present invention will be described. However, the conditions of Examples are only a conditional example employed to check the applicability and effects of the present invention, and the present invention is not limited to the conditional example. The present invention can employ various conditions without departing from the spirit of the present invention as long as the object of the present invention is accomplished.

A predetermined amount of pure metal ingots were used to have the plating bath compositions shown in Table 1 and thus plating baths were made. A plated steel sheet was obtained from an original steel sheet for plating was formed into using a batch type hot dipping apparatus containing the plating bath. The plating bath temperature was set to 605° C.

As the original steel sheet for plating, a cold-rolled steel sheet having a sheet thickness of 0.8 mm defined according to JIS G3141 was cut into a size of vertical 100 mm×horizontal 200 mm and used.

In Examples, an apparatus having a structure in which a hot dip line was used. Specifically, the apparatus has a plating original sheet heating unit, a snout unit, a hot dip plating bath unit, a wiping unit, and a heating cooling device. In addition, in this apparatus, all steps up to plating can be performed under a $N_2$-5% $H_2$ environment.

First, before plating bath immersion, the original steel sheet for plating surface was retained in an atmosphere of a $N_2$-5% $H_2$ gas with a dew point of −40° C. and a temperature of 800° C. for 1 minute and reduced. Then, after the steel sheet (original steel sheet for plating) was air-cooled by a $N_2$ gas and the steel sheet temperature reached 620° C., the steel sheet was immersed at an immersion rate of 500 mm/sec and retained in the plating bath for about 3 seconds.

After plating bath immersion, the steel sheet was pulled up at a pulling rate of 150 mm/sec. At the time of pulling-up, the plating adhesion amount of wiping gas ($N_2$) was adjusted to 40 to 250 g/m². The oxygen concentration in the snout in contact with the plating bath was set to 20 ppm or less.

The cooling conditions after plating adhesion amount adjustment were as shown in Table 2. For cooling, a $N_2$ gas was used. In this manner, various plated steel sheets were produced. The steel sheet temperature at the time of hot dip plating is the surface temperature at the center of the plated plate.

TABLE 1

| Plating bath | Plating bath component (mass %) | | | | | | | |
|---|---|---|---|---|---|---|---|---|
| | Zn | Al | Mg | Si | Cr | Sr | Ca | Ni |
| 1 | Bal. | 55 | 2.0 | 1.6 | — | — | — | — |
| 2 | Bal. | 55 | 2.0 | 1.6 | 0.10 | — | — | — |
| 3 | Bal. | 55 | 2.0 | 1.6 | 0.05 | — | — | — |
| 4 | Bal. | 55 | 2.0 | 1.6 | 0.01 | — | — | — |
| 5 | Bal. | 55 | 2.0 | 1.6 | 0.10 | 0.05 | — | — |
| 6 | Bal. | 55 | 2.0 | 1.6 | 0.10 | — | 0.02 | — |
| 7 | Bal. | 55 | 2.0 | 1.6 | 0.10 | — | — | 0.1 |
| 8 | Bal. | 55 | 2.0 | 1.6 | — | 0.10 | — | — |
| 9 | Bal. | 55 | 2.0 | 1.6 | — | — | 0.01 | — |
| 10 | Bal. | 55 | 2.0 | 1.6 | — | — | — | 0.1 |
| 11 | Bal. | 55 | 10.0 | 1.6 | — | — | — | — |
| 12 | Bal. | 55 | 3.0 | 1.6 | — | — | — | — |
| 13 | Bal. | 55 | 1.0 | 1.6 | — | — | — | — |
| 14 | Bal. | 55 | 2.0 | 5.0 | — | — | — | — |
| 15 | Bal. | 55 | 2.0 | 3.0 | — | — | — | — |
| 16 | Bal. | 55 | 2.0 | 0.5 | — | — | — | — |
| 17 | Bal. | 65 | 2.0 | 1.6 | — | — | — | — |
| 18 | Bal. | 45 | 2.0 | 1.6 | — | — | — | — |
| 19 | Bal. | 70 | 2.0 | 1.6 | — | — | — | — |
| 20 | Bal. | 40 | 2.0 | 1.6 | — | — | — | — |
| 21 | Bal. | 55 | 11.0 | 1.6 | — | — | — | — |
| 22 | Bal. | 55 | 0.5 | 1.6 | — | — | — | — |
| 23 | Bal. | 55 | 2.0 | 6.0 | — | — | — | — |
| 24 | Bal. | 55 | 2.0 | 0.4 | — | — | — | — |
| 25 | Bal. | 55 | 0.0 | 1.6 | — | — | — | — |

TABLE 2

| Production condition | Steel sheet after plating bath immersion (° C.) | Cooling rate ° C./sec | Cooling stop temperature ° C. | Retention temperature ° C. | Retention time sec | Cooling rate ° C./sec | Cooling stop temperature ° C. |
|---|---|---|---|---|---|---|---|
| A | 605° C. | 8 | — | — | — | — | <200° C. |
| B | 605° C. | 30 | — | — | — | — | <200° C. |
| C | 605° C. | 8 | 455 | — | — | 30 | <200° C. |
| D1 | 605° C. | 30 | 450 | 450 to 400 | 10 | 30 | <200° C. |
| D2 | 605° C. | 30 | 450 | 450 to 400 | 5 | 30 | <200° C. |
| D3 | 605° C. | 30 | 450 | 450 to 400 | 20 | 30 | <200° C. |

Regarding the obtained plated steel sheet, the average composition of the plated layer and the alloy layer, the volume fraction of the Mg—Si phase in the plated layer (cross section area fraction), the average equivalent circle diameter of the Mg—Si phase of the surface layer area, and (Si content integrated value on the surface side)/(Si content integrated value over the entire thickness) were obtained by the following methods.

In addition, the corrosion resistance and the workability were evaluated.

(Average Composition of Plated Layer and Alloy Layer)

Regarding the average composition of the plated layer and the alloy layer, the plating composition can be obtained by dissolving and separating the plated layer and the alloy layer from the plated steel sheet on which the plated layer and the alloy layer are formed using hydrochloric acid, using the mass of the plated layer and the alloy layer dissolved in the hydrochloric acid as a denominator, and using the mass of the element quantitatively determined by ICP for the separated plated layer and alloy layer as a numerator.

(Volume Fraction of Mg—Si Phase in Plated Layer)

The volume fraction of the Mg—Si phase was obtained by mapping the element distribution using SEM-EDS and obtaining the area fraction (cross-sectional area fraction) of each phase in the cross section of the plated layer.

(Average Equivalent Circle Diameter of Mg—Si Phase of Surface Layer Area)

A Si distribution in a range of 500×500 μm (visual field) in the surface layer area of the plated layer (a range at a position from the surface of the plated layer to a depth of about 1 μm) from the surface side of the plated layer was measured using EPMA. An area including the phase containing the Si measured was calculated and the diameter of a circle with the same area as the area was used as the equivalent circle diameter of the Mg—Si phase. In addition, the obtained equivalent circle diameters of the Mg—Si phases were averaged to obtain an average equivalent circle diameter.

(Si Content Integrated Value on Surface Side)/(Si Content Integrated Value Over Entire Thickness)

The Si content was continuously measured using a Markus type high frequency glow discharge optical emission spectroscopic apparatus (GD-Profiler2: manufactured by Horiba, Ltd.) by setting the measurement diameter to 4 mm, and performing element analysis while digging a sample by Ar sputtering from the surface of the plated layer to the interface between the plated layer and the alloy layer in the thickness direction. The measured values of the Si content obtained from the surface of the plated layer to the thickness center of the plated layer were integrated and the integrated value (Si content integrated value on the surface side) was calculated. In addition, the Si content over the entire thickness of the plated layer (from the surface of the plated layer to the interface between the plated layer and the alloy layer) was integrated and the integrated value (Si content integrated value over the entire thickness) was calculated.

Then, (Si content integrated value on the surface side) was divided by (Si content integrated value over the entire thickness) to obtain a value of (Si content integrated value on the surface side)/(Si content integrated value over the entire thickness).

(Corrosion Resistance)

For the evaluation of corrosion resistance, the plated steel sheet was exposed in the shade for 1 year in Miyakojima, Okinawa, and then corrosion weight loss (steel sheet weight before test−steel sheet weight after test) was obtained. The corrosion weight loss was evaluated based on the following standards and a grade "G" or higher was evaluated as excellent corrosion resistance. The results are shown in Table 4.

EX: The corrosion weight loss was less than 5 g/m$^2$.

VG: The corrosion weight loss was 5 g/m$^2$ or more and less than 10 g/m$^2$.

G: The corrosion weight loss was 10 g/m$^2$ or more and less than 20 g/m$^2$.

F: The corrosion weight loss was 20 g/m$^2$ or more and less than 25 g/m$^2$.

B: The corrosion weight loss was 25 g/m$^2$ or more.

Here, the test place in Miyakojima, Okinawa, where the corrosion resistance evaluation is performed, is an exposure place with a coast 2 km south of an island having an area of about 160 km$^2$, which is located slightly to the north of the Tropic of Cancer and located in the East China Sea, and the environment is an environment with many natural degradation factors such as high temperature and humidity, solar radiation, and sea salt particles in a subtropical climate.

(Workability)

For the evaluation of workability, a bending test was performed on the plated steel sheet under the condition of a bend radius R=2 μmm. The presence or absence of cracks and peeling was visually observed, and the results were evaluated as follows.

VG: There is no cracks and peeling.

G: There are cracks and peeling occurs.

B: Peeling occurs.

The results are shown in Table 4.

TABLE 3

| Production No. | Kind of plating | Average composition of plated layer and alloy layer (mass %) Balance Zn, Fe and impurities | | | | | | | Cooling condition |
|---|---|---|---|---|---|---|---|---|---|
| | | Al | Mg | Si | Cr | Sr | Ca | Ni | |
| 1 | 1 | 56.1 | 1.95 | 1.62 | — | — | — | — | D1 |
| 2 | 1 | 55.8 | 2.02 | 1.45 | — | — | — | — | D2 |
| 3 | 1 | 56.2 | 1.98 | 1.38 | — | — | — | — | D3 |
| 4 | 2 | 56.0 | 1.99 | 1.42 | 0.09 | — | — | — | D1 |
| 5 | 2 | 55.8 | 2.05 | 1.40 | 0.10 | — | — | — | D2 |
| 6 | 2 | 56.2 | 1.98 | 1.39 | 0.08 | — | — | — | D3 |
| 7 | 3 | 56.1 | 2.00 | 1.42 | 0.05 | — | — | — | D1 |
| 8 | 4 | 56.0 | 1.99 | 1.35 | 0.01 | — | — | — | D1 |
| 9 | 5 | 56.2 | 2.01 | 1.60 | 0.09 | 0.05 | — | — | D1 |
| 10 | 6 | 55.9 | 1.98 | 1.60 | 0.09 | — | 0.02 | — | D1 |
| 11 | 7 | 56.0 | 2.05 | 1.45 | 0.09 | — | — | 0.09 | D1 |
| 12 | 8 | 56.0 | 2.08 | 1.60 | — | 0.10 | — | — | D1 |
| 13 | 9 | 56.2 | 2.00 | 1.60 | — | — | 0.01 | — | D1 |
| 14 | 10 | 55.9 | 1.99 | 1.50 | — | — | — | 0.10 | D1 |
| 15 | 11 | 56.1 | 9.98 | 1.60 | — | — | — | — | D1 |
| 16 | 12 | 55.6 | 2.99 | 1.62 | — | — | — | — | D1 |
| 17 | 13 | 55.0 | 1.01 | 1.60 | — | — | — | — | D1 |
| 18 | 14 | 55.0 | 2.00 | 4.95 | — | — | — | — | D1 |
| 19 | 15 | 55.0 | 2.01 | 2.94 | — | — | — | — | D1 |
| 20 | 16 | 55.0 | 1.97 | 0.51 | — | — | — | — | D1 |
| 21 | 17 | 65.0 | 1.93 | 1.32 | — | — | — | — | D1 |
| 22 | 18 | 45.0 | 2.01 | 1.65 | — | — | — | — | D1 |
| 23 | 1 | 56.5 | 1.95 | 1.45 | — | — | — | — | A |
| 24 | 1 | 56.2 | 1.98 | 1.51 | — | — | — | — | B |
| 25 | 1 | 56.3 | 1.98 | 1.50 | — | — | — | — | C |
| 26 | 19 | <u>70.0</u> | 2.00 | 1.60 | — | — | — | — | D1 |
| 27 | 20 | <u>40.0</u> | 2.00 | 1.60 | — | — | — | — | D1 |
| 28 | 21 | 55.0 | <u>11.00</u> | 1.60 | — | — | — | — | D1 |

TABLE 3-continued

| Production No. | Kind of plating | Average composition of plated layer and alloy layer (mass %) Balance Zn, Fe and impurities | | | | | | | Cooling condition |
|---|---|---|---|---|---|---|---|---|---|
| | | Al | Mg | Si | Cr | Sr | Ca | Ni | |
| 29 | 22 | 55.0 | 0.50 | 1.60 | — | — | — | — | D1 |
| 30 | 23 | 55.0 | 2.00 | 6.00 | — | — | — | — | D1 |
| 31 | 24 | 55.0 | 2.00 | 0.40 | — | — | — | — | D1 |
| 32 | 25 | 55.0 | 0.00 | 1.60 | — | — | — | — | D1 |

TABLE 4

| Production No. | Area fraction of cross section of Mg—Si phase in plated layer (%) | Average equivalent circle diameter of Mg—Si phase in surface layer area (μm) | (Si content integrated value on surface side)/(Si content integrated value over entire thickness) | Corrosion resistance | Workability | Remarks |
|---|---|---|---|---|---|---|
| 1 | 12.0 | 4.9 | 0.63 | VG | VG | Invention |
| 2 | 10.0 | 0.8 | 0.60 | VG | VG | Example |
| 3 | 8.0 | 14.5 | 0.65 | VG | VG | |
| 4 | 10.0 | 4.5 | 0.63 | EX | VG | |
| 5 | 10.0 | 1.0 | 0.60 | EX | VG | |
| 6 | 10.0 | 13.5 | 0.65 | EX | VG | |
| 7 | 10.0 | 1.0 | 0.62 | EX | VG | |
| 8 | 8.0 | 1.0 | 0.63 | EX | VG | |
| 9 | 12.0 | 1.0 | 0.63 | EX | VG | |
| 10 | 12.0 | 1.0 | 0.62 | EX | VG | |
| 11 | 12.0 | 1.0 | 0.60 | EX | VG | |
| 12 | 12.0 | 1.0 | 0.60 | VG | VG | |
| 13 | 12.0 | 1.0 | 0.60 | VG | VG | |
| 14 | 11.0 | 1.0 | 0.61 | VG | VG | |
| 15 | 12.0 | 1.0 | 0.75 | G | G | |
| 16 | 12.0 | 1.0 | 0.60 | VG | VG | |
| 17 | 12.0 | 1.0 | 0.56 | G | VG | |
| 18 | 20.0 | 6.5 | 0.70 | VG | G | |
| 19 | 15.0 | 4.5 | 0.60 | VG | VG | |
| 20 | 4.0 | 0.2 | 0.56 | G | VG | |
| 21 | 7.0 | 0.9 | 0.60 | VG | VG | |
| 22 | 12.0 | 1.0 | 0.62 | G | VG | |
| 23 | 8.0 | — | 0.20 | F | B | Comparative |
| 24 | 11.0 | — | 0.50 | F | B | Example |
| 25 | 12.0 | 21.0 | 0.70 | G | B | |
| 26 | 12.0 | 1.0 | 0.60 | B | G | |
| 27 | 12.0 | 1.0 | 0.60 | B | G | |
| 28 | 12.0 | 1.0 | 0.75 | F | B | |
| 29 | 12.0 | 0.9 | 0.60 | B | VG | |
| 30 | 30.0 | 5.5 | 0.70 | F | B | |
| 31 | 5.0 | 1.0 | 0.34 | B | VG | |
| 32 | — | — | 0.60 | B | VG | |

As shown in Tables 1 to 4, in Production Nos. 1 to 22 in which the average composition of the plated layer and the alloy layer, the volume fraction of the Mg—Si phase in the plated layer, the average equivalent circle diameter of the Mg—Si phase of the surface layer area of the plated layer, and Si content integrated value on the surface side)/(Si content integrated value over the entire thickness) are in the range of the present invention, the corrosion resistance and the workability are excellent.

On the other hand, in Production Nos. 23 to 32 in which any of the conditions is out of the range of the present invention, either the workability or the corrosion resistance is deteriorated.

As described above, it is presumed that there is a difference in corrosion resistance and workability between Examples and Comparative Examples due to the difference in the composition of the plated layer and the segregation state of the Mg—Si phase.

INDUSTRIAL APPLICABILITY

According to the embodiment of the present invention, it is possible to provide a Zn—Al—Mg-based plated steel sheet having excellent corrosion resistance and workability. The Zn—Al—Mg-based plated steel sheet is suitable for building materials, automobiles and home appliances, and has high industrial utility value.

What is claimed is:

1. A Zn—Al—Mg-based plated steel sheet comprising:
a steel sheet;
an alloy layer which is formed on a surface of the steel sheet and contains Fe and Si; and
a plated layer which is formed on a surface of the alloy layer opposite to the steel sheet,
wherein an average composition of the plated layer and the alloy layer includes, in mass %,
Al: 45.0 to 65.0%,
Si: 0.50 to 5.00%,
Mg: 1.00 to 10.00%, and
a balance of Zn, Fe, and impurities,
the plated layer contains 0.1 to 20.0% of a Mg—Si phase in terms of volume fraction,
in a case where a 1 µm range from a surface of the plated layer in a thickness direction of the plated layer is defined as a surface layer area of the plated layer, an average equivalent circle diameter of the Mg—Si phase in the surface layer area in a direction in which the plated layer is observed in a plan view of the surface layer area is 0.1 to 15.0 µm, and
in a case where a ½ thickness position of the plated layer from the surface of the plated layer to an interface between the plated layer and the alloy layer is defined as a thickness center of the plated layer and a Si content is measured over the entire thickness of the plated layer in mass %, an integrated value of the Si content from the surface of the plated layer to the thickness center of the plated layer is 0.55 times or more of an integrated value of the Si content from the surface of the plated layer to the interface.

2. The Zn—Al—Mg-based plated steel sheet according to claim 1,
wherein the integrated value of the Si content from the surface of the plated layer to the thickness center of the plated layer is 0.60 times or more of the integrated value of the Si content from the surface of the plated layer to the interface.

3. The Zn—Al—Mg-based plated steel sheet according to claim 2,
wherein the average composition of the plated layer and the alloy layer further includes 0.01 to 1.00% in total of one or more of the group consisting of Cr, Ca, Sr, and Ni.

4. The Zn—Al—Mg-based plated steel sheet according to claim 1,
wherein the average composition of the plated layer and the alloy layer further includes 0.01 to 1.00% in total of one or more of the group consisting of Cr, Ca, Sr, and Ni.

* * * * *